United States Patent
Fukumizu et al.

(10) Patent No.: US 10,290,877 B2
(45) Date of Patent: May 14, 2019

(54) MEMBRANE ELECTRODE ASSEMBLY

(71) Applicant: HONDA MOTOR CO., LTD., Tokyo (JP)

(72) Inventors: Takao Fukumizu, Wako (JP); Hiroshi Matsumori, Wako (JP); Takuma Yamawaki, Wako (JP); Yoichi Asano, Wako (JP); Mihoko Kawaharada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 287 days.

(21) Appl. No.: 14/086,009

(22) Filed: Nov. 21, 2013

(65) Prior Publication Data
US 2014/0141356 A1    May 22, 2014

(30) Foreign Application Priority Data

Nov. 22, 2012  (JP) .................................. 2012-255783
Oct. 22, 2013  (JP) .................................. 2013-218805

(51) Int. Cl.
| | |
|---|---|
| *H01M 8/10* | (2016.01) |
| *H01M 4/86* | (2006.01) |
| *H01M 8/1007* | (2016.01) |
| *H01M 8/1018* | (2016.01) |

(52) U.S. Cl.
CPC ....... *H01M 4/8605* (2013.01); *H01M 4/8657* (2013.01); *H01M 8/1007* (2016.02); *H01M 2008/1095* (2013.01); *H01M 2250/20* (2013.01); *Y02T 90/32* (2013.01)

(58) Field of Classification Search
CPC ............. H01M 8/1004; H01M 4/8605; H01M 8/1007; H01M 4/8657; H01M 2250/20; H01M 2008/1095; Y02T 90/32
See application file for complete search history.

(56) References Cited

U.S. PATENT DOCUMENTS

| | | | |
|---|---|---|---|
| 2005/0260476 A1 | 11/2005 | Xie | |
| 2006/0141338 A1* | 6/2006 | Wang et al. | ..................... 429/44 |
| 2008/0311462 A1* | 12/2008 | Yamauchi et al. | .............. 429/41 |

FOREIGN PATENT DOCUMENTS

| | | |
|---|---|---|
| JP | 2005-332672 A | 12/2005 |
| JP | 2010-040377 A | 2/2010 |
| JP | 2010-146769 A | 7/2010 |

* cited by examiner

*Primary Examiner* — Philip A. Stuckey
(74) *Attorney, Agent, or Firm* — Squire Patton Boggs (US) LLP

(57) ABSTRACT

A membrane electrode assembly includes a solid polymer electrolyte membrane sandwiched between a pair of electrodes. Each of the electrodes has an electrode catalyst layer and a gas diffusion layer, the electrode catalyst layer facing the electrolyte membrane. A porous layer having a thickness of 5 to 40 μm and a seepage pressure of 10 to 60 kPa is interposed between the electrode catalyst layer and the gas diffusion layer. The porous layers preferably have a spring constant of 100 to 1000 GPa/m. The membrane electrode assembly may be devoid of any one of the porous layers.

4 Claims, 8 Drawing Sheets

| | THICKNESS [μm] | SEEPAGE PRESSURE [kPa] | SPRING CONSTANT [GPa/m] | THICKNESS DISPERSION OF ELECTROLYTE MEMBRANE [μm²] |
|---|---|---|---|---|
| COMPARATIVE EXAMPLE 1 | 2.8 | 8.3 | 4195.9 | 3.39 |
| COMPARATIVE EXAMPLE 2 | 4.5 | 9.3 | 1030.5 | 3.27 |
| EXAMPLE 1 | 5.2 | 10.2 | 991.4 | 2.88 |
| EXAMPLE 2 | 5.3 | 10.1 | 977.4 | 2.97 |
| EXAMPLE 3 | 15.4 | 20.3 | 698.3 | 1.35 |
| EXAMPLE 4 | 18.9 | 15.8 | 697.4 | 1.93 |
| EXAMPLE 5 | 25.1 | 16.9 | 683.2 | 1.86 |
| EXAMPLE 6 | 27.7 | 35.4 | 422.6 | 0.67 |
| EXAMPLE 7 | 31.4 | 44.7 | 367.5 | 0.85 |
| EXAMPLE 8 | 39.6 | 58.9 | 102.3 | 0.61 |

FIG. 2

| | THICKNESS [μm] | SEEPAGE PRESSURE [kPa] | SPRING CONSTANT [GPa/m] | THICKNESS DISPERSION OF ELECTROLYTE MEMBRANE [μm²] |
|---|---|---|---|---|
| COMPARATIVE EXAMPLE 1 | 2.8 | 8.3 | 4195.9 | 3.39 |
| COMPARATIVE EXAMPLE 2 | 4.5 | 9.3 | 1030.5 | 3.27 |
| EXAMPLE 1 | 5.2 | 10.2 | 991.4 | 2.88 |
| EXAMPLE 2 | 5.3 | 10.1 | 977.4 | 2.97 |
| EXAMPLE 3 | 15.4 | 20.3 | 698.3 | 1.35 |
| EXAMPLE 4 | 18.9 | 15.8 | 697.4 | 1.93 |
| EXAMPLE 5 | 25.1 | 16.9 | 683.2 | 1.86 |
| EXAMPLE 6 | 27.7 | 35.4 | 422.6 | 0.67 |
| EXAMPLE 7 | 31.4 | 44.7 | 367.5 | 0.85 |
| EXAMPLE 8 | 39.6 | 58.9 | 102.3 | 0.61 |

FIG. 6

| | THICKNESS [μm] | SEEPAGE PRESSURE [kPa] | SPRING CONSTANT [GPa/m] | POWER GENERATION PROPERTY (CELL VOLTAGE) [V] |
|---|---|---|---|---|
| COMPARATIVE EXAMPLE 1 | 2.8 | 8.3 | 4195.9 | 0.696 |
| EXAMPLE 1 | 5.2 | 10.2 | 991.4 | 0.704 |
| EXAMPLE 3 | 15.4 | 20.3 | 698.3 | 0.712 |
| EXAMPLE 6 | 27.7 | 35.4 | 422.6 | 0.715 |
| EXAMPLE 7 | 31.4 | 44.7 | 367.5 | 0.714 |
| EXAMPLE 8 | 39.6 | 58.9 | 102.3 | 0.711 |
| COMPARATIVE EXAMPLE 3 | 44.1 | 63.2 | 88.7 | 0.699 |

MEMBRANE ELECTRODE ASSEMBLY

CROSS-REFERENCE TO RELATED APPLICATIONS

This application is based upon and claims the benefit of priority from Japanese Patent Applications No. 2012-255783 filed on Nov. 22, 2012 and No. 2013-218805 filed on Oct. 22, 2013, the contents all of which are incorporated herein by reference.

BACKGROUND OF THE INVENTION

Field of the Invention

The present invention relates to a membrane electrode assembly containing a solid polymer electrolyte membrane and electrodes disposed on either side thereof, wherein each of the electrodes contains an electrode catalyst layer and a gas diffusion layer, and at least one of the electrodes further contains a porous layer between the electrode catalyst layer and the gas diffusion layer.

Description of the Related Art

In a solid polymer fuel cell, a membrane electrode assembly is interposed between a pair of separators to form a unit cell. The membrane electrode assembly contains an ion-exchange polymer electrolyte membrane, an anode facing one surface of the membrane, and a cathode facing the other surface of the membrane.

Each of the anode and the cathode has an electrode catalyst layer and a gas diffusion layer. The electrode catalyst layer is disposed facing the electrolyte membrane, and acts as a reaction field of an electrode reaction. The gas diffusion layer acts to diffuse and supply a reactant gas to the electrode catalyst layer. In general, the gas diffusion layer is composed of a carbon paper or the like. Therefore, for example, a fiber in the gas diffusion layer may be stuck into the electrolyte membrane to physically deform the membrane. In this case, the electrolyte membrane may be deteriorated, and the gas barrier property against the reactant gas may be lowered. Thus, it is necessary to prevent the physical deformation of the electrolyte membrane.

In view of preventing the sticking of the fiber in the gas diffusion layer into the electrolyte membrane through the electrode catalyst layer, for example, in Japanese Laid-Open Patent Publication No. 2010-040377, electrolyte-rich portions are discontinuously arranged in the stacking direction of the electrode catalyst layer, whereby the electrode catalyst layer exhibits a strong binding property in the plane direction.

In general, in the membrane electrode assembly, the overall size (surface area) of the electrode catalyst layer is smaller than that of the electrolyte membrane. Thus, the outer peripheral edge of the electrolyte membrane is exposed on the outside of the electrode catalyst layer. Consequently, for example, in production of the membrane electrode assembly, when the gas diffusion layer is thermally compression-bonded to the electrolyte membrane, the fiber in the gas diffusion layer may be disadvantageously stuck into the outer peripheral edge of the electrolyte membrane.

In view of solving the problem, for example, in Japanese Laid-Open Patent Publication No. 2010-146769, a reinforcement member is used for preventing the periphery of the gas diffusion layer from being brought into direct contact with the electrolyte membrane. Specifically, only two opposite sides of the electrolyte membrane are exposed on the outside of the electrode catalyst layer, and the reinforcement member is disposed on each of the two sides to prevent the sticking of the fiber in the diffusion layer.

However, in the technologies of Japanese Laid-Open Patent Publication Nos. 2010-040377 and 2010-146769, as described above, the membrane electrode assembly has a complicated structure containing the specially-configured electrode catalyst layer or electrolyte membrane. Thus, the technologies are disadvantageous in low membrane electrode assembly productivity and increased production cost. In view of avoiding the problem, for example, as described in Japanese Laid-Open Patent Publication No. 2005-332672, a reinforcement layer may be interposed between the electrolyte membrane and the electrode catalyst layer to prevent the sticking of the fiber in the diffusion layer into the electrolyte membrane.

SUMMARY OF THE INVENTION

However, in a case where the reinforcement layer is interposed between the electrolyte membrane and the electrode catalyst layer as described in Japanese Laid-Open Patent Publication No. 2005-332672, the water retention ability of the membrane electrode assembly may be changed. For example, when the water retention ability is excessively lowered, the electrolyte membrane is dried and exhibits a low proton conductivity. On the other hand, when the water retention ability is excessively increased, a so-called flooding is caused. In each case, the power generation property of the fuel cell is deteriorated.

Thus, in Japanese Laid-Open Patent Publication Nos. 2010-040377, 2010-146769, and 2005-332672, even in the case of forming the additional layer, maintenance of the power generation property of the fuel cell is not considered at all.

A principal object of the present invention is to provide a membrane electrode assembly having a simple structure capable of preventing physical deformation of an electrolyte membrane and achieving an excellent power generation property.

According to an aspect of the present invention, there is provided a membrane electrode assembly comprising a solid polymer electrolyte membrane sandwiched between a pair of electrodes, wherein each of the electrodes contains an electrode catalyst layer and a gas diffusion layer, the electrode catalyst layer facing the electrolyte membrane, and at least one of the electrodes further contains a porous layer having a thickness of 5 to 40 μm and a seepage pressure of 10 to 60 kPa interposed between the electrode catalyst layer and the gas diffusion layer.

In the membrane electrode assembly of the present invention, the porous layer having the above physical properties is interposed between the electrode catalyst layer and the gas diffusion layer. The porous layer does not inhibit electrode reactions, can act to avoid contact of a fiber of the gas diffusion layer with the electrolyte membrane, and can prevent physical deformation of the electrolyte membrane.

Furthermore, by using the above physical properties in the porous layer, the physical deformation of the electrolyte membrane can be more effectively prevented, and the water permeability between the electrode catalyst layer and the gas diffusion layer can be appropriately controlled. The membrane electrode assembly can exhibit well-balanced water retention and water discharge properties. Thus, the membrane electrode assembly can have a satisfactory water retention property for maintaining the electrolyte membrane in a wet state, thereby achieving an excellent proton conductivity, and can have a satisfactory water discharge property for preventing stagnation of water or the like generated in the electrode reactions, thereby rapidly diffusing a reactant gas. Consequently, the power generation property of the membrane electrode assembly can be improved by forming the porous layer having the above physical properties between the electrode catalyst layer and the gas diffusion layer.

The membrane electrode assembly, which has a simple structure capable of preventing the physical deformation of the electrolyte membrane and achieving the excellent power generation property, can be obtained in this manner.

The porous layer preferably has a spring constant of 100 to 1000 GPa/m. In this case, the thickness dispersion (unevenness) of the electrolyte membrane can be effectively reduced to prevent the physical deformation of the electrolyte membrane, and the water retention and water discharge properties can be well balanced in the electrodes. As a result, the power generation property of the membrane electrode assembly can be further improved.

The porous layer preferably has a thickness of 15 to 40 μm and a seepage pressure of 15 to 60 kPa. In addition, the porous layer preferably has a spring constant of 100 to 700 GPa/m. In this case, the thickness dispersion of the electrolyte membrane can be further reduced (e.g. to 2.0 or less), and the water retention and water discharge properties can be further well balanced in the electrodes. As a result, the power generation property of the membrane electrode assembly can be further improved.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 is a table showing the physical property values of porous layers and the thickness dispersions of electrolyte membranes in membrane electrode assemblies in Examples 1 to 8 and Comparative Examples 1 and 2;

FIG. 6 is a table showing the physical property values of porous layers and the power generation properties of the membrane electrode assemblies in Examples 1, 3 and 6 to 8 and Comparative Examples 1 and 3;

DESCRIPTION OF THE PREFERRED EMBODIMENTS

A preferred embodiment of membrane electrode assembly of the present invention will be described in detail below with reference to accompanying drawings.

Figure 1:
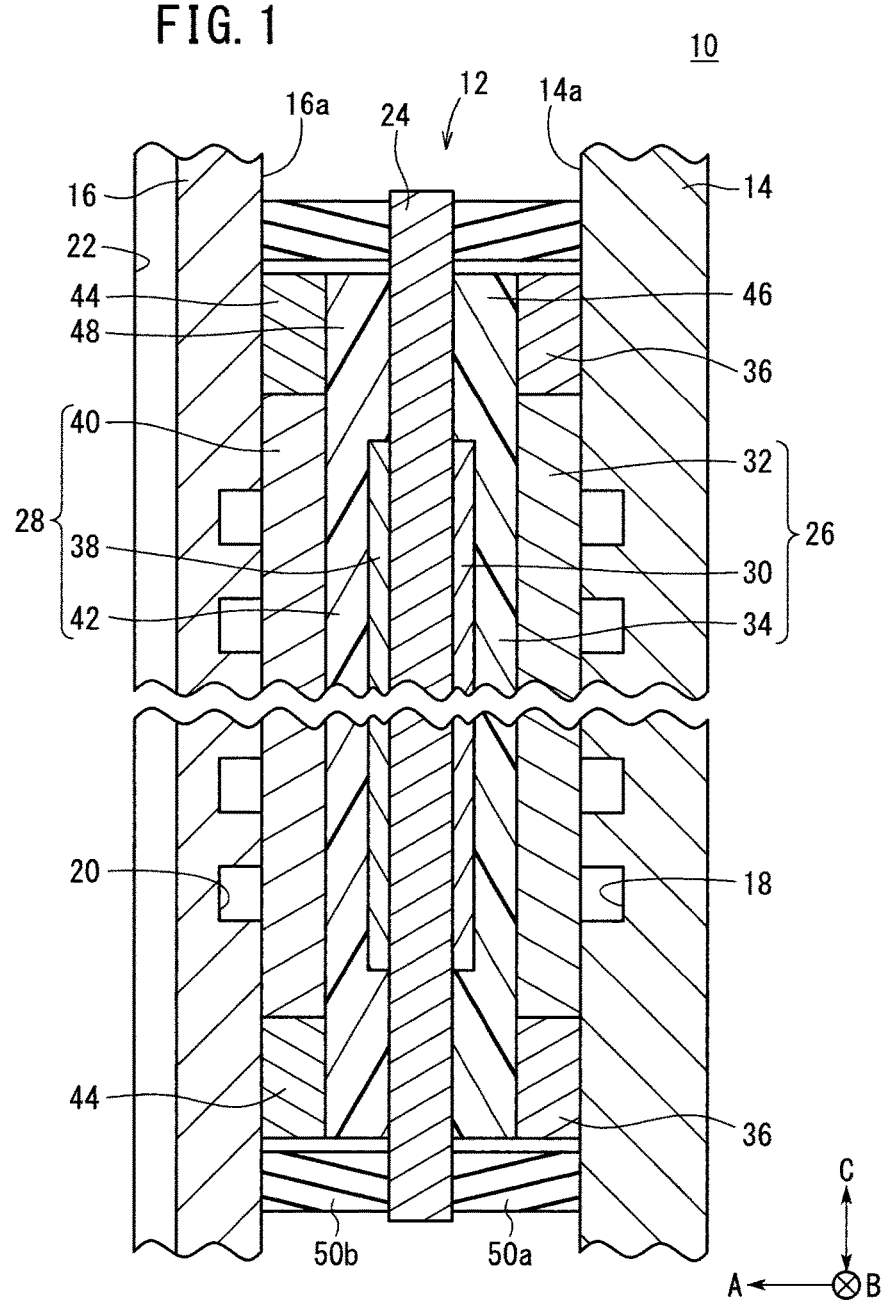
FIG. 1 is a schematic longitudinal sectional view of a principal part of a fuel cell containing a membrane electrode assembly according to an embodiment of the present invention.

FIG. 1 is a schematic longitudinal sectional view of a principal part of a solid polymer fuel cell 10. The fuel cell 10 contains a membrane electrode assembly 12 according to this embodiment.

First the structure of the fuel cell 10 will be described below. In the fuel cell 10, for example, the membrane electrode assembly 12, an anode-side separator 14, and a cathode-side separator 16 are stacked in the standing states. For example, a plurality of the fuel cells 10 are stacked in the stacking direction (the direction of arrow A of FIG. 1) and used as a vehicle fuel cell stack or the like (not shown). Each of the anode-side separator 14 and the cathode-side separator 16 may be a carbon separator, and may be a metal separator.

A fuel gas flow field 18 extends in the horizontal direction (perpendicular to the paper plane of FIG. 1, hereinafter referred to simply as the B direction) on an anode surface 14*a* of the anode-side separator 14 (the surface facing the membrane electrode assembly 12). The fuel gas flow field 18 is communicated with a fuel gas inlet passage for supplying a fuel gas such as a hydrogen-containing gas (not shown) and a fuel gas outlet passage for discharging the fuel gas (not shown).

Similarly, an oxygen-containing gas flow field 20 extends in the horizontal direction (the B direction) on a cathode surface 16*a* of the cathode-side separator 16 (the surface facing the membrane electrode assembly 12). The oxygen-containing gas flow field 20 is communicated with an oxygen-containing gas inlet passage for supplying an oxygen-containing gas such as an oxygen-containing gas (not shown) and an oxygen-containing gas outlet passage for discharging the oxygen-containing gas (not shown). It should be noted that the fuel gas in the fuel gas flow field 18 and the oxygen-containing gas in the oxygen-containing gas flow field 20 flow in different opposite directions.

When a plurality of the fuel cells 10 are stacked, the outer surface of the anode-side separator 14 faces the outer surface of the cathode-side separator 16. A coolant flow field 22 is integrally formed between the outer surfaces. The coolant flow field 22 is communicated with a coolant inlet passage for supplying a coolant (not shown) and a coolant outlet passage for discharging the coolant (not shown).

The membrane electrode assembly 12 contains a solid polymer electrolyte membrane 24, an anode 26, and a cathode 28. The electrolyte membrane 24 is sandwiched between the anode 26 and the cathode 28. The overall size (surface area) of the electrolyte membrane 24 is larger than the overall sizes of the anode 26 and the cathode 28. Therefore, the reactant gas supplied to one of the anode 26 and the cathode 28 is prevented from being transferred through the electrolyte membrane 24 to the other, and out leakage of the reactant gas is prevented.

The electrolyte membrane 24 may be a film prepared from a proton-conductive polymer of a cation-exchange resin. For example, the cation-exchange resin may be a vinyl polymer sulfonate such as a polystyrene sulfonate; a polymer provided by introducing a sulfonate or phosphate group to a heat-resistant polymer such as a perfluoroalkyl sulfonate polymer, a perfluoroalkyl carboxylate polymer, a polybenzimidazole, or a polyether ether ketone; a polymer provided by introducing a sulfonate group to a main component of a rigid polyphenylene obtained by polymerizing an aromatic compound having a phenylene chain; etc.

The anode 26 and the cathode 28 are formed such that the electrolyte membrane 24 is sandwiched therebetween. The anode 26 has a first electrode catalyst layer 30, a first gas diffusion layer 32, and a first porous layer 34. A first insulation sheet 36 is formed as a sealant on an outer periphery of the first porous layer 34. On the other hand, the cathode 28 has a second electrode catalyst layer 38, a second gas diffusion layer 40, and a second porous layer 42. A second insulation sheet 44 is formed on an outer periphery of the second porous layer 42.

The first electrode catalyst layer 30 contains catalyst particles and an ion-conductive polymer binder. The catalyst particle may be obtained by depositing a catalyst metal such as platinum on a catalyst support such as a carbon black. Alternatively, the catalyst particle may be a catalyst metal particle free of the catalyst carrier (e.g. a platinum black). The first electrode catalyst layer 30 may contain two or more catalyst layers having different compositions. The overall size of the first electrode catalyst layer 30 is smaller than that of the electrolyte membrane 24.

For example, the first gas diffusion layer 32 contains a base material of a carbon paper, which is obtained by adding a large number of fibrous carbons to a cellulose. The overall size of the first gas diffusion layer 32 is larger than that of the first electrode catalyst layer 30.

The first porous layer 34 is a porous layer containing an electron-conductive substance and a water-repellent resin. The first porous layer 34 has particular physical property values including a thickness of 5 to 40 μm, a seepage pressure of 10 to 60 kPa, and a spring constant of 100 to 1000 GPa/m. It is more preferred that the first porous layer 34 has a thickness of 15 to 40 μm, a seepage pressure of 15 to 60 kPa, and a spring constant of 100 to 700 GPa/m. By controlling the physical property values of the first porous layer 34 within the ranges, the power generation property of the fuel cell 10 can be improved as described hereinafter.

For example, the thickness and the spring constant of the first porous layer 34 can be measured using a laser displacement meter, and the seepage pressure can be measured using a perm-porometer manufactured by PMI (Porous Materials, Inc.)

The first porous layer 34 has an electric conductivity based on the electron-conductive substance. Preferred examples of the electron-conductive substances include furnace blacks (such as KETJEN BLACK EC and KETJEN BLACK EC-600JD available from Ketjen Black International Company, VULCAN XC-72 available from Cabot Corporation, TOKABLACK available from Tokai Carbon Co., Ltd., and ASAHI AX available from Asahi Carbon Co., Ltd.; trade names), acetylene blacks (such as DENKA BLACK available from Denki Kagaku Kogyo K.K.; trade name), ground products of glassy carbons, vapor-grown carbon fibers (such as VGCF and VGCF-H available from Showa Denko K.K.; trade names), carbon nanotubes, graphitized powders thereof, and mixtures of the powders.

Examples of materials of the water-repellent resins include crystalline fluororesins such as ETFE (tetrafluoroethylene-ethylene copolymers), PVDF (polyvinylidene fluorides), PVF (polyvinyl fluorides), ECTFE (chlorotrifluoroethylene-ethylene copolymers), PTFE (polytetrafluoroethylenes), PFA (tetrafluoroethylene-perfluoroalkyl vinyl ether copolymers), and FEP (tetrafluoroethylene-hexafluoropropylene copolymers); amorphous fluororesins such as LUMIFLON and CYTOP available from Asahi Glass Co., Ltd. (trade names); silicone resins; and non-hydrophilic resins such as polyethylenes and polystyrenes.

In the first porous layer 34, the mixing ratio of the electron-conductive substance and the water-repellent resin is preferably 0.5:1 to 50:1, more preferably 0.8:1 to 8:1. In this case, it is easy to obtain the first porous layer 34 having the suitable physical property values including the seepage pressure and the spring constant within the above ranges. When the content of the electron-conductive substance exceeds the mixing ratio range mentioned above, it may be difficult to satisfactorily bond the first porous layer 34 and the first electrode catalyst layer 30. When the content of the water-repellent resin exceeds the mixing ratio range, it may be difficult to maintain the satisfactory electric conductivity of the first porous layer 34.

The overall size of the first porous layer 34 is larger than that of the first gas diffusion layer 32. Therefore, the outer peripheral edge of the electrolyte membrane 24 is exposed to the outside from the first electrode catalyst layer 30, and the first porous layer 34 is interposed also between the first gas diffusion layer 32 and the exposed portion of the electrolyte membrane 24. Thus, the first porous layer 34 is disposed between the first electrode catalyst layer 30 and the first gas diffusion layer 32 and between the electrolyte membrane 24 and the first gas diffusion layer 32. Consequently, the fiber in the first gas diffusion layer 32 can be prevented from being stuck into the electrolyte membrane 24 (particularly into the outer peripheral edge of the electrolyte membrane 24), and the physical deformation of the electrolyte membrane 24 can be prevented.

The first porous layer 34 is exposed on the outside from the first gas diffusion layer 32. The exposed portion of the first porous layer 34 is referred to as a first outer peripheral portion 46. The first outer peripheral portion 46 may be made gas impermeable by pressing or impregnation with treated to be a resin agent. The first insulation sheet 36 having a frame shape is disposed on the surface of the first outer peripheral portion 46 (the surface facing the anode-side separator 14).

For example, the first insulation sheet 36 may be an approximately flat, gas-impermeable film composed of PEN (polyethylene naphthalate) or the like. The thickness of the first insulation sheet 36 is approximately equal to that of the first gas diffusion layer 32, so that the outer surface of the first insulation sheet 36 corresponds to that of the first gas diffusion layer 32.

Because of the gas impermeability of the first outer peripheral portion 46 and the first insulation sheet 36, transfer and mixing of the reactant gases can be effectively prevented between the anode 26 and the cathode 28.

The second electrode catalyst layer 38, the second gas diffusion layer 40, the second porous layer 42, and the second insulation sheet 44 in the cathode 28 have the same structures as the first electrode catalyst layer 30, the first gas diffusion layer 32, the first porous layer 34, and the first insulation sheet 36 respectively. Therefore, a detailed description of the components in the cathode 28 is herein omitted. The second porous layer 42 has a second outer peripheral portion 48 shown in FIG. 1. Incidentally, the first electrode catalyst layer 30 and the second electrode catalyst layer 38 may have different overall sizes.

A first sealing member 50 a and a second sealing member 50 b surrounding the first porous layer 34 and the second porous layer 42 may be placed on the anode-side separator 14 and the cathode-side separator 16 respectively. The leakage of the reactant gases from the membrane electrode assembly 12 to the outside (out leakage) can be efficiently prevented by the first sealing member 50 a and the second sealing member 50 b.

A method for producing the above membrane electrode assembly 12 will be described below.

In the production of the membrane electrode assembly 12, the proton-conductive polymer of the cation-exchange resin is selected first, and the polymer is formed into a membrane in a shape of a rectangular sheet to obtain the electrolyte membrane 24.

The first electrode catalyst layer 30 is formed on one surface of the electrolyte membrane 24, and the second electrode catalyst layer 38 is formed on the other surface. Specifically, the catalyst particles and an organic solvent are added to a solution containing a polymer similar to the polymer used in the electrolyte membrane 24 (polymer electrolyte), and the solution is mixed to prepare a catalyst paste.

Then, a predetermined amount of the catalyst paste is applied to a film composed of PTFE or the like. The catalyst paste-coated surface of the film is thermally compression-bonded to the one surface of the electrolyte membrane 24, and the film is peeled off, so that the catalyst paste is transferred to the one surface. The catalyst paste is transferred also to the other surface of the electrolyte membrane 24 in the same manner.

Meanwhile, the first porous layer 34 is formed on the first gas diffusion layer 32 to obtain a first stacked body, and the second porous layer 42 is formed on the second gas diffusion layer 40 to obtain a second stacked body.

Specifically, for example, the electron-conductive substance and the water-repellent resin are mixed in an organic solvent such as ethylene glycol to prepare a paste for forming the porous layers. A predetermined amount of this porous layer paste is applied to the first gas diffusion layer 32, and is heat-treated to form the first porous layer 34, whereby the first stacked body is obtained. Similarly, a predetermined amount of the porous layer paste is applied to the second gas diffusion layer 40, and is heat-treated to form the second porous layer 42, whereby the second stacked body is obtained.

For example, the thicknesses, the seepage pressures, and the spring constants of the first porous layer 34 and the second porous layer 42 can be controlled within the above-described ranges respectively by appropriately selecting the amounts of the porous layer paste applied to the first gas diffusion layer 32 and the second gas diffusion layer 40, the concentrations (solid content concentrations) of the electron-conductive substance and the water-repellent resin in the organic solvent in the porous layer paste, the mixing ratio, etc.

The first porous layer 34 and the second porous layer 42 may be formed as sheets. In this case, the porous layer paste is prepared with increased concentrations (solid content concentrations) of the electron-conductive substance and the water-repellent resin in the organic solvent, the solvent is removed by extraction, and the resultant is subjected to a stretching treatment or the like, to form the sheets of the first porous layer 34 and the second porous layer 42.

The sheets of the first porous layer 34 and the second porous layer 42 are placed on the first gas diffusion layer 32 and the second gas diffusion layer 40, respectively, and then pressed and heated (hot-pressed) in this state, whereby the first porous layer 34 is thermally compression-bonded to the first gas diffusion layer 32 to obtain the first stacked body, and the second porous layer 42 is thermally compression-bonded to the second gas diffusion layer 40 to obtain the second stacked body.

The obtained first and second stacked bodies are placed on the first electrode catalyst layer 30 and the second electrode catalyst layer 38, respectively, in the manner such that the first porous layer 34 and the second porous layer 42 face the first electrode catalyst layer 30 and the second electrode catalyst layer 38, respectively. The components are integrated by thermal compression bonding or the like to produce the membrane electrode assembly 12.

As described above, the first porous layer 34 is interposed between the first gas diffusion layer 32 and the first electrode catalyst layer 30 and between the first gas diffusion layer 32 and the electrolyte membrane 24. Therefore, even in a case where a load is applied to the first and second stacked bodies in the thermal compression bonding process, the fiber in the first gas diffusion layer 32 can be prevented from being stuck into the electrolyte membrane 24, and the physical deformation of the electrolyte membrane 24 can be prevented.

The fuel cell 10 is produced by sandwiching the membrane electrode assembly 12 between the anode-side separator 14 and the cathode-side separator 16.

The fuel cell 10 containing the membrane electrode assembly 12 of this embodiment has the above basic structure. The advantageous effects thereof will be described below.

When the fuel cell 10 is operated to generate electric power, the oxygen-containing gas is supplied to the oxygen-containing gas inlet passage, and the fuel gas such as the hydrogen-containing gas is supplied to the fuel gas inlet passage. Furthermore, the coolant such as pure water or ethylene glycol is supplied to the coolant inlet passage.

The coolant is introduced from the coolant inlet passage into the coolant flow field 22 formed between the anode-side separator 14 and the cathode-side separator 16. In the coolant flow field 22, the coolant is moved in the gravitational direction (the direction of arrow C shown in FIG. 1). Thus, the coolant acts to cool the entire power generation surface of the membrane electrode assembly 12, and is then discharged to the coolant outlet passage.

The oxygen-containing gas is introduced from the oxygen-containing gas inlet passage into the oxygen-containing gas flow field 20 on the cathode-side separator 16. In the oxygen-containing gas flow field 20, the oxygen-containing gas flows in the direction of arrow B along the cathode 28 in the membrane electrode assembly 12.

The fuel gas is introduced from the fuel gas inlet passage into the fuel gas flow field 18 on the anode-side separator 14. In the fuel gas flow field 18, the fuel gas flows in the direction of arrow B along the anode 26 in the membrane electrode assembly 12.

Consequently, in the membrane electrode assembly 12, the fuel gas is supplied to the anode 26 and moved through the first gas diffusion layer 32 and the first porous layer 34, and the oxygen-containing gas is supplied to the cathode 28 and moved through the second gas diffusion layer 40 and the second porous layer 42. The fuel gas and the oxygen-containing gas are consumed in electrochemical reactions (electrode reactions) in the first electrode catalyst layer 30 and the second electrode catalyst layer 38, respectively, whereby the fuel cell 10 generates the electric power.

More specifically, the fuel gas is supplied from the fuel gas flow field 18 to the anode 26 and moved through the first gas diffusion layer 32 and the first porous layer 34, and hydrogen molecules in the fuel gas is ionized in the first electrode catalyst layer 30 to generate protons (H$^+$) and electrons. The electrons are extracted as an electric energy for energizing an external load (not shown) electrically connected to the fuel cell 10. The protons are moved through the electrolyte membrane 24 in the membrane electrode assembly 12 and reach the cathode 28. Incidentally, the protons are moved from the anode 26 to the cathode 28 together with water in the electrolyte membrane 24.

The protons moved to the cathode 28, the electrons reaching the cathode 28 after the energization of the external load, and oxygen molecules in the oxygen-containing gas supplied to the cathode 28 and moved through the second gas diffusion layer 40 and the second porous layer 42 are bonded to generate water in the second electrode catalyst layer 38 of the cathode 28. As a result, water is generated. This water is hereinafter referred to also as the generated water.

In order to achieve an excellent proton conductivity in the electrolyte membrane 24 during the electrode reactions, it is necessary to maintain the electrolyte membrane 24 in a wet state. However, in a case where the generated water or the like remains in a pore in the first electrode catalyst layer 30, the second electrode catalyst layer 38, the first gas diffusion layer 32, or the second gas diffusion layer 40, the flow field of the reactant gas may be clogged, and thus flooding may be caused to inhibit the electrode reaction. Therefore, the anode 26 and the cathode 28 are required to have a satisfactory water retention property for maintaining the electrolyte membrane 24 in the wet state and a satisfactory water discharge property for rapidly diffusing the reactant gas. These properties have to be well balanced, though the properties may be incompatible with each other.

In the membrane electrode assembly 12, as described above, the first porous layer 34 is interposed between the electrolyte membrane 24 and the first gas diffusion layer 32, and the second porous layer 42 is interposed between the electrolyte membrane 24 and the second gas diffusion layer 40. Furthermore, the thicknesses, the seepage pressures, and the spring constants of the first porous layer 34 and the second porous layer 42 are controlled within the above ranges. Therefore, the generated water permeability can be controlled between the first electrode catalyst layer 30 and the first gas diffusion layer 32 and between the second electrode catalyst layer 38 and the second gas diffusion layer 40.

Thus, the membrane electrode assembly 12 can exhibit well-balanced water retention and water discharge properties, so that the electrolyte membrane 24 can have the excellent proton conductivity, and the reactant gases can be more efficiently diffused to accelerate the electrode reactions. Consequently, the power generation property of the fuel cell 10 containing the membrane electrode assembly 12 can be improved.

The present invention is not particularly limited to the above embodiment, and various changes and modifications may be made therein without departing from the scope of the invention.

For example, though the membrane electrode assembly 12 has the first porous layer 34 and the second porous layer 42 in the above embodiment, it is not necessary to form both of the layers, and the membrane electrode assembly 12 may have only one of the layers. It is particularly preferred that the membrane electrode assembly 12 has the second porous layer 42 because the water is generated in the electrode reaction in the cathode 28.

EXAMPLES

Example 1

(1) First and second gas diffusion layers having the same structure were formed in the same manner. Specifically, a carbon paper having a bulk density of 0.31 g/m$^2$ and a thickness of 190 µm was impregnated with a dispersion liquid of a tetrafluoroethylene-hexafluoropropylene copolymer (FEP), FEP 120-JRB DISPERSION (trade name) available from Du Pont-Mitsui Fluorochemicals Co., Ltd., and the resultant paper was dried at 120° C. for 30 minutes. In this step, the dry weight ratio of the FEP to the carbon paper was 2.4% by weight.

(2) 12 g of a vapor-grown carbon VGCF (trade name) available from Showa Denko K.K., 20 g of a dispersion liquid FEP 120-JRB (having a solid content concentration of 54%, trade name) available from Du Pont-Mitsui Fluorochemicals Co., Ltd., and 200 g of ethylene glycol were stirred and mixed using a ball mill to prepare a paste for forming a porous layer.

(3) The porous layer paste prepared in (2) was applied by a blade coater to each of the first and second gas diffusion layers formed in (1) in such a manner that the resultant porous layer had a thickness of 5.2 µm. The applied paste was heat-treated at 380° C. for 30 minutes, whereby the first and second porous layers were formed to prepare first and second stacked bodies, respectively.

(4) A platinum catalyst LSA (trade name) available from BASF was added to an ion-conductive polymer solution DE2020CS (trade name) available from Du Pont such that the weight ratio of the LSA to the DE2020CS was 0.1. The solution was stirred and mixed in a ball mill to prepare a catalyst paste.

(5) The catalyst paste prepared in (4) was applied to a PTFE sheet in such a manner that the platinum density was 0.7 mg/cm$^2$. The applied paste was heat-treated at 120° C. for 60 minutes to obtain a sheet for transferring a first electrode catalyst layer to one surface of an electrolyte membrane.

(6) The catalyst paste prepared in (4) was applied to a PTFE sheet in such a manner that the platinum density was 0.1 mg/cm$^2$. The applied paste was heat-treated at 120° C. for 60 minutes to obtain a sheet for transferring a second electrode catalyst layer to the other surface of the electrolyte membrane.

(7) The catalyst paste-coated surfaces of the sheets prepared in (5) and (6) were thermally compression-bonded to the surfaces of a fluorine-containing electrolyte membrane having a thickness of 24 µm and an ion-exchange capacity of 1.05 meq/g, and the PTFE sheets were peeled off. Thus, by using a decal method, the first electrode catalyst layer was formed on one surface of the electrolyte membrane, and the second electrode catalyst layer was formed on the other surface.

(8) The first porous layer on the first gas diffusion layer and the second porous layer on the second gas diffusion layer formed in (3) were thermally compression-bonded at 120° C. under a surface pressure of 30 kgf/cm$^2$ to the first and second electrode catalyst layers formed on the electrolyte membrane in (7) respectively. A membrane electrode assembly of Example 1 was produced in this manner.

Example 2

In the step of (2), 12 g of a carbon VULCAN XC-72R (trade name) available from Cabot Corporation, 20 g of the dispersion liquid FEP 120-JRB (trade name) having a solid content concentration of 54%, available from Du Pont-Mitsui Fluorochemicals Co., Ltd., and 155 g of ethylene glycol were stirred and mixed using a ball mill to prepare a paste for forming a porous layer.

The porous layer paste was applied by the blade coater to each of the first and second gas diffusion layers formed in (1) such that the resultant porous layer had a thickness of 5.3 μm. A membrane electrode assembly of Example 2 was produced in the same manner as Example 1 except for the porous layer paste and the thickness.

Example 3

A membrane electrode assembly of Example 3 was produced in the same manner as Example 1 except that the porous layer paste prepared in (2) was applied by the blade coater to each of the first and second gas diffusion layers formed in (1) such that the resultant layer had a thickness of 15.4 μm.

Example 4

A membrane electrode assembly of Example 4 was produced in the same manner as Example 1 except that the porous layer paste prepared in Example 2 was applied by the blade coater to each of the first and second gas diffusion layers formed in (1) such that the resultant layer had a thickness of 18.9 μm.

Example 5

A membrane electrode assembly of Example 5 was produced in the same manner as Example 1 except that the porous layer paste prepared in Example 2 was applied by the blade coater to each of the first and second gas diffusion layers formed in (1) such that the resultant layer had a thickness of 25.1 μm.

Example 6

A membrane electrode assembly of Example 6 was produced in the same manner as Example 1 except that the porous layer paste prepared in (2) was applied by the blade coater to each of the first and second gas diffusion layers formed in (1) such that the resultant layer had a thickness of 27.7 μm.

Example 7

A membrane electrode assembly of Example 7 was produced in the same manner as Example 1 except that the porous layer paste prepared in (2) was applied by the blade coater to each of the first and second gas diffusion layers formed in (1) such that the resultant layer had a thickness of 31.4 μm.

Example 8

A membrane electrode assembly of Example 8 was produced in the same manner as Example 1 except that the porous layer paste prepared in (2) was applied by the blade coater to each of the first and second gas diffusion layers formed in (1) such that the resultant layer had a thickness of 39.6 μm.

Comparative Example 1

A membrane electrode assembly of Comparative Example 1 was produced in the same manner as Example 1 except that the porous layer paste prepared in (2) was applied by the blade coater to each of the first and second gas diffusion layers formed in (1) such that the resultant layer had a thickness of 2.8 μm.

Comparative Example 2

A membrane electrode assembly of Comparative Example 2 was produced in the same manner as Example 1 except that the porous layer paste prepared in Example 2 was applied by the blade coater to each of the first and second gas diffusion layers formed in (1) such that the resultant layer had a thickness of 4.5 μm.

Comparative Example 3

A membrane electrode assembly of Comparative Example 3 was produced in the same manner as Example 1 except that the porous layer paste prepared in (2) was applied by the blade coater to each of the first and second gas diffusion layers formed in (1) such that the resultant layer had a thickness of 44.1 μm.

In each of the membrane electrode assemblies of Examples 1 to 8 and Comparative Examples 1 to 3, the physical property values of the thickness [μm], the seepage pressure [kPa], and the spring constant [GPa/m] of the first porous layer and the dispersion [μm] of the thickness (the thickness dispersion) of the electrolyte membrane were measured. The results for the examples other than Comparative Example 3 are shown in FIG. 2. Since the second porous layer was formed in the same manner as the first porous layer, the physical property values of the second porous layer were omitted in FIG. 2. Hereinafter, the first and second porous layers are not distinguished and are referred to simply as the porous layer. Similarly, the first and second gas diffusion layers are referred to simply as the gas diffusion layer, and the first and second electrode catalyst layers are referred to simply as the electrode catalyst layer.

The thickness of the porous layer was measured by using a common laser displacement meter. Incidentally, the thickness of the gas diffusion layer was equal to that of the carbon paper.

The seepage pressure of the porous layer was measured using a perm-porometer manufactured by PMI (Porous Materials, Inc.) Specifically, first, a stacked body of the gas diffusion layer and the porous layer was cut into a circular shape having a diameter of 1 inch to prepare a stack sample. Further, only the gas diffusion layer was cut into the same shape to prepare a diffusion layer sample. A pure water was dropped onto the porous layer in the stack sample to form a water film, and an air pressure was gradually applied to the water film by the perm-porometer. The minimum pressure, required for the pure water to start passing through the stack sample, was measured as a measurement value of the stacked body. The minimum pressure of the diffusion layer sample was measured as a diffusion layer measurement value in the same manner. The seepage pressure of the porous layer was calculated by subtracting the diffusion layer measurement value from the measurement value of the stacked body.

The spring constant of the porous layer was measured using the above laser displacement meter. Specifically, a pressure of 3.0 MPa was applied to each of a first sample containing the gas diffusion layer with the porous layer and a second sample containing only the gas diffusion layer, and then the pressure was lowered. The thickness of each sample was measured when the pressure was lowered to 2.0 MPa and 1.0 MPa, respectively. The spring constant k of the porous layer was calculated using the measurement results in the following equation (1).

A1 represents the thickness of the first sample at 1.0 MPa, and A2 represents the thickness of the first sample at 2.0 MPa. B1 represents the thickness of the second sample at 1.0 MPa, and B2 represents the thickness of the second sample at 2.0 MPa.

$$k=(2.0-1.0)/\{(A1-B1)-(A2-B2)\} \quad (1)$$

The thickness dispersion of the electrolyte membrane was measured using a scanning electron microscope (SEM). Specifically, first, the membrane-electrode assembly was cut to prepare a sample. The sample was embedded in an epoxy resin solution. In this solution, the ratio of the base resin and the hardener was 27:3. The solution was subjected to a defoaming treatment using a vacuum dryer or the like, and the epoxy resin was hardened over 12 hours. EpoFix (trade name) available from Struers A/S or the like was used as the epoxy resin.

Then, the sample embedded in the hardened epoxy resin was cut to observe a cross-sectional surface. The cut surface was ground with a water-resistant paper and polished with an alumina solution containing alumina particles having a diameter of 0.05 μm. In this surface, a 5-mm straight line was selected as a measurement range on the electrolyte membrane, and the thicknesses of 500 points arranged at intervals of 10 μm in the measurement range were measured. The thickness dispersion V(X) of the electrolyte membrane was calculated using the measurement results in the following equation (2).

E(X) represents a function (expectation) of the mean value of the thicknesses measured in the 500 points, and $E(X^2)$ represents a function (expectation) of the mean-square value of the thicknesses measured in the 500 points. V(X) is obtained in the unit of $μm^2$, though the unit is omitted in the equation (2).

$$V(X)=E(X^2)-(E(X))^2 \quad (2)$$

Figure 3:
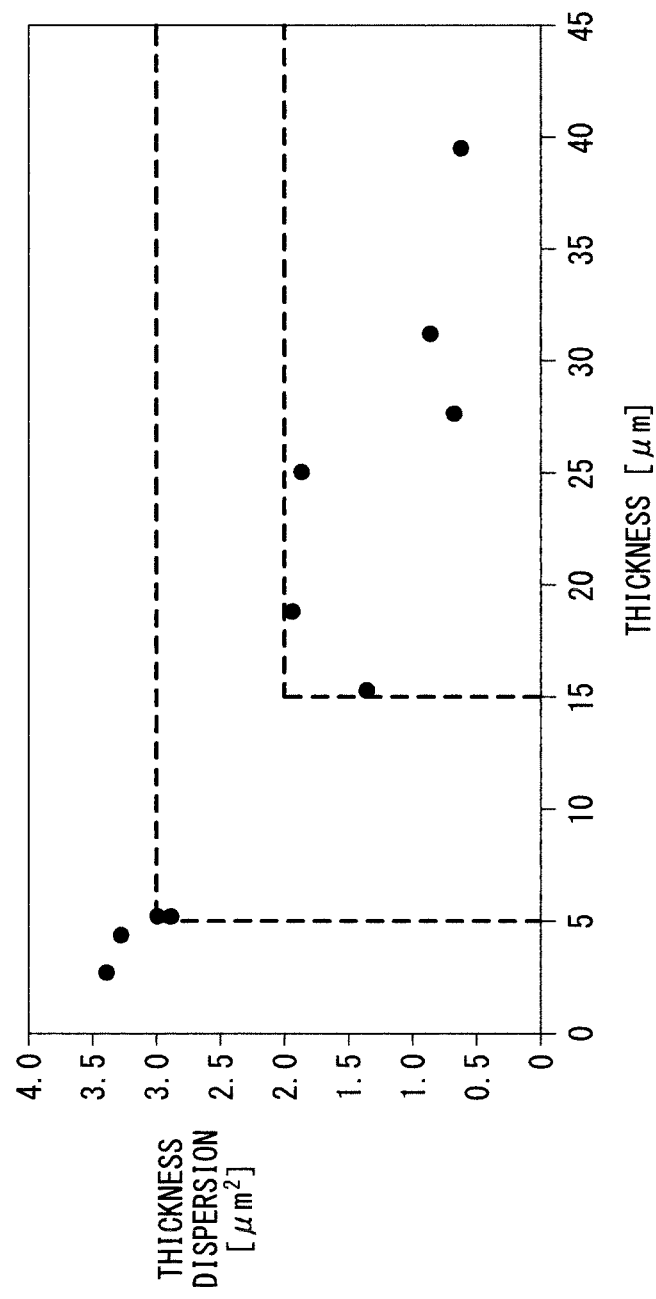
FIG. 3 is a graph showing the relationship between the thicknesses of the porous layers and the thickness dispersions of the electrolyte membranes in the membrane electrode assemblies of Examples 1 to 8 and Comparative Examples 1 and 2.

The relationship between the thicknesses of the porous layers and the thickness dispersions of the electrolyte membranes in Examples 1 to 8 and Comparative Examples 1 and 2, based on the values of FIG. 2, is shown in FIG. 3. As shown in FIG. 3, it is clear that when the porous layer has a thickness of 5 μm or more, the thickness dispersion of the electrolyte membrane can be reduced to 3.0 or less. Furthermore, it is clear that when the porous layer has a thickness of 15 μm or more, the thickness dispersion of the electrolyte membrane can be reduced to 2.0 or less. This means that the thickness unevenness of the electrolyte membrane can be reduced to prevent the physical deformation of the electrolyte membrane by increasing the thickness of the porous layer to 5 μm or more, more preferably 15 μm or more.

Figure 4:
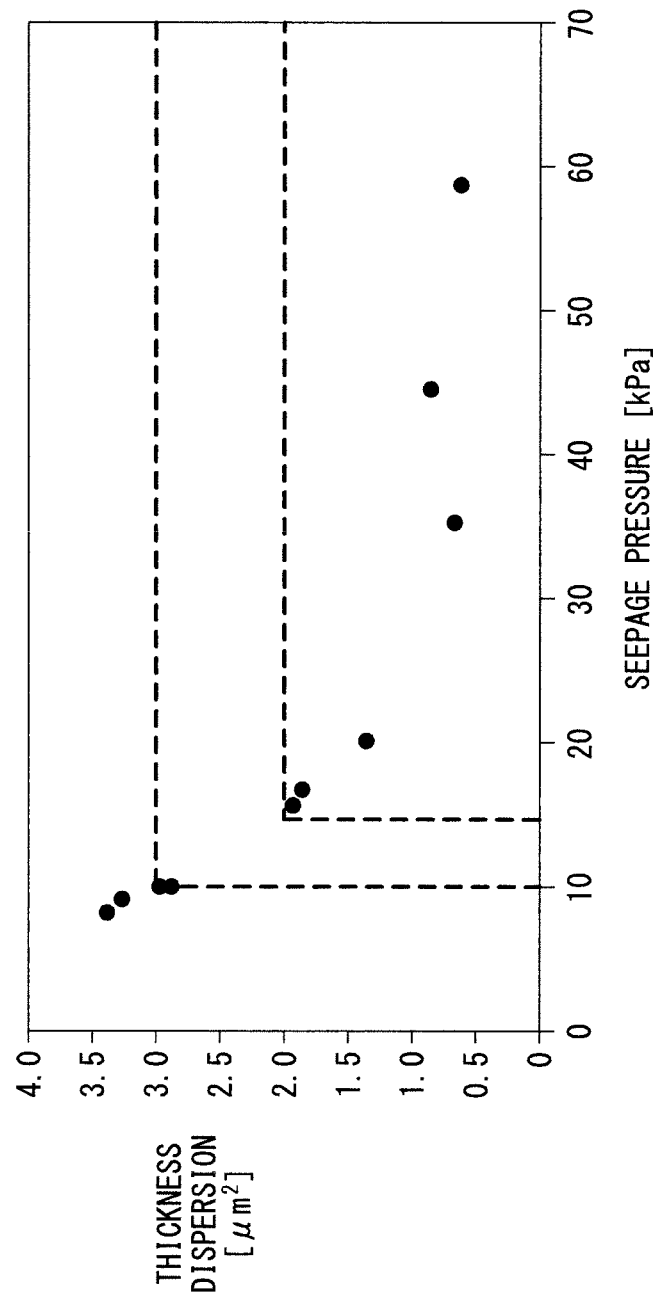
FIG. 4 is a graph showing the relationship between the seepage pressures of the porous layers and the thickness dispersions of the electrolyte membranes in the membrane electrode assemblies of Examples 1 to 8 and Comparative Examples 1 and 2.

The relationship between the seepage pressures of the porous layers and the thickness dispersions of the electrolyte membranes in Examples 1 to 8 and Comparative Examples 1 and 2, based on the values of FIG. 2, is shown in FIG. 4. As shown in FIG. 4, it is clear that when the porous layer has a seepage pressure of 10 kPa or more, the thickness dispersion of the electrolyte membrane can be reduced to 3.0 or less. Further, it is clear that when the porous layer has a seepage pressure of 15 kPa or more, the thickness dispersion of the electrolyte membrane can be reduced to 2.0 or less.

Figure 5:
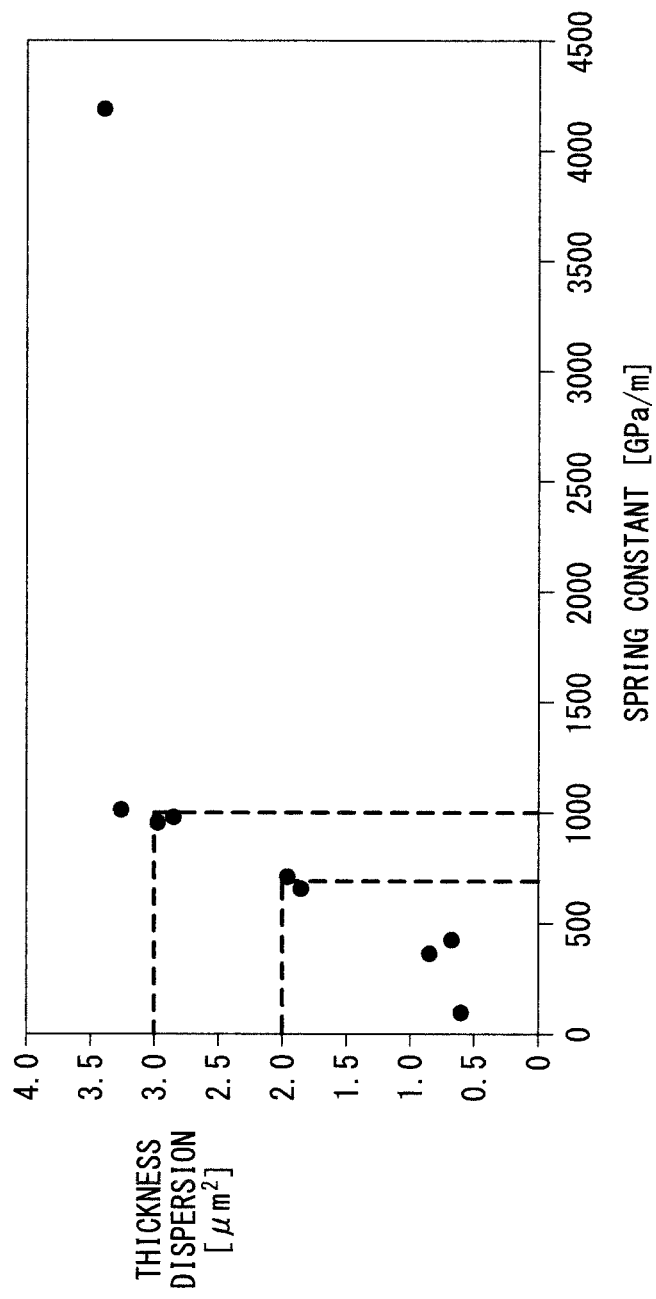
FIG. 5 is a graph showing the relationship between the spring constants of the porous layers and the thickness dispersions of the electrolyte membranes in the membrane electrode assemblies of Examples 1 to 8 and Comparative Examples 1 and 2.

The relationship between the spring constants of the porous layers and the thickness dispersions of the electrolyte membranes in Examples 1 to 8 and Comparative Examples 1 and 2, based on the values of FIG. 2, is shown in FIG. 5. As shown in FIG. 5, it is clear that when the porous layer has a spring constant of 1000 GPa/m or less, the thickness dispersion of the electrolyte membrane can be reduced to 3.0 or less. Further, it is clear that when the porous layer has a spring constant of 700 GPa/m or less, the thickness dispersion of the electrolyte membrane can be reduced to 2.0 or less.

As is clear from the results, when the porous layer has controlled values of a thickness of 5 μm or more, a seepage pressure of 10 kPa or more, and a spring constant of 1000 GPa/m or less, the thickness dispersion of the electrolyte membrane can be reduced. The other words, the physical deformation of the electrolyte membrane can be prevented.

Consequently, the substances can be readily transferred between the anode and the cathode, and the electrode reactions can be efficiently carried out, whereby the power generation property of a fuel cell can be improved. This advantageous effect is significantly improved when the porous layer has controlled values of a thickness of 15 μm or more, a seepage pressure of 15 kPa or more, and a spring constant of 700 GPa/m or less.

Furthermore, particularly when the porous layer has a spring constant of 100 to 1000 GPa/m, the porous layer exhibits a satisfactory spring property. Thus, a fuel cell stack, obtained by stacking and bonding the membrane-electrode assembly containing the porous layer and the separators, exhibits a certain level of spring property in the stacking direction. Such fuel cell stack is exposed to an appropriate bonding load due to the spring property. Therefore, for example, it is not necessary to dispose a spring mechanism such as a disc spring at both ends of the fuel cell stack in the stacking-direction. Thus, an additional component such as a spring mechanism can be omitted in the stack.

A fuel cell (standard cell) containing each of the membrane electrode assemblies of Examples 1, 3 and 6 to 8 and Comparative Examples 1 and 3 was produced, and the cell voltage [V] of the fuel cell was measured. The results are shown in FIG. 6 together with the above physical property values of the thicknesses, seepage pressures, and spring constants.

The fuel cell was operated at a temperature of 70° C. in a humidified atmosphere of 100% RH. The gas consumption rate in the anode was 70%, the gas consumption rate in the cathode was 60%, the gas pressure in the anode was 130 kPa, and the gas pressure in the cathode was 100 kPa.

Figure 7:
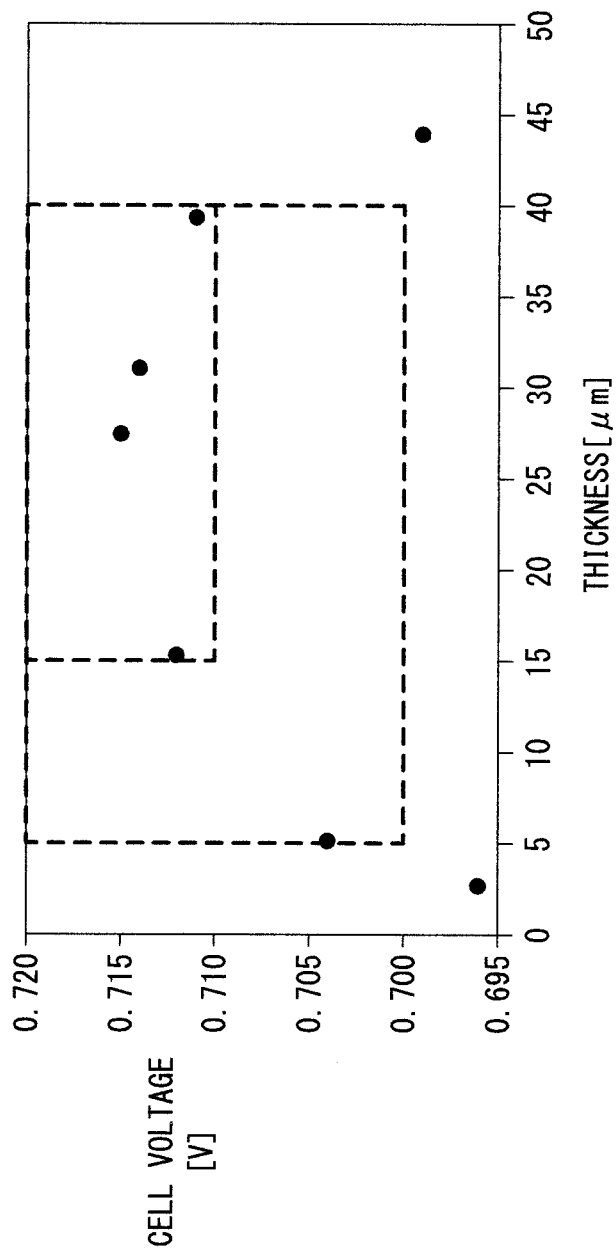
FIG. 7 is a graph showing the relationship between the thicknesses of the porous layers and the cell voltages of the membrane electrode assemblies in Examples 1, 3 and 6 to 8 and Comparative Examples 1 and 3.

The relationship between the thicknesses of the porous layers and the cell voltages (the power generation properties) of the fuel cells in Examples 1, 3 and 6 to 8 and Comparative Examples 1 and 3, based on the values of FIG. 6, is shown in FIG. 7. As shown in FIG. 7, it is clear that when the porous layer has a thickness of at least 5 μm but less than 40 μm, the fuel cell can exhibit a cell voltage of 0.70 V or more and thus an excellent power generation property.

Further, it is clear that when the porous layer has a thickness of at least 15 μm but less than 40 μm, the fuel cell can exhibit a cell voltage of 0.71 V or more and thus a more excellent power generation property.

Figure 8:
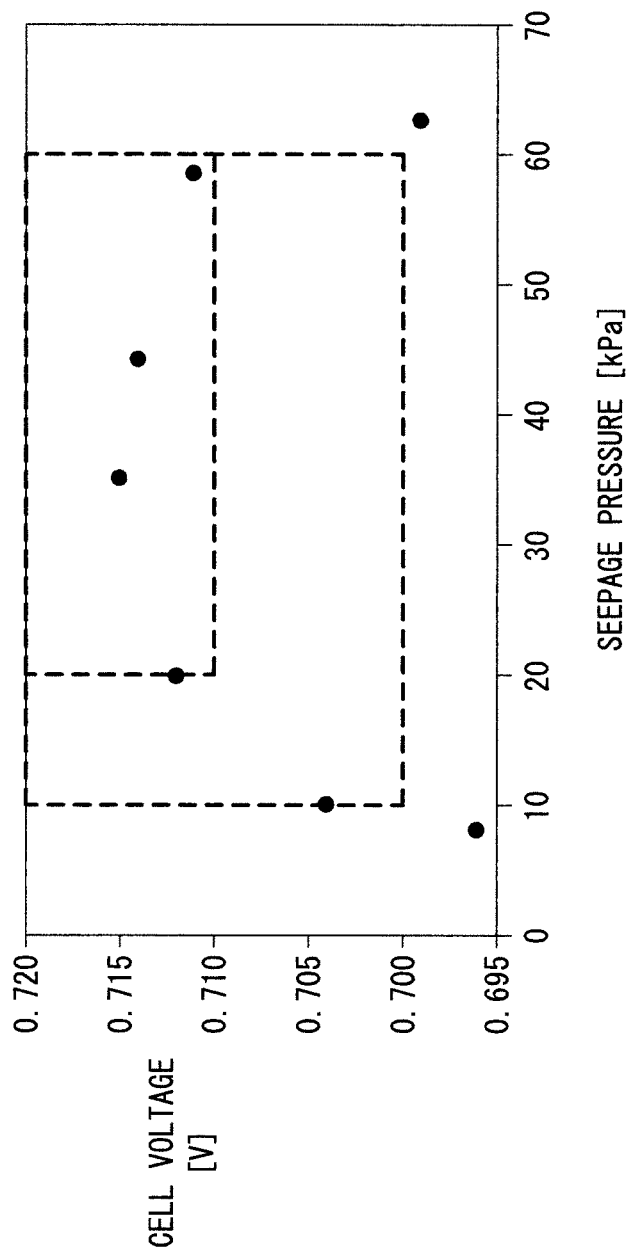
FIG. 8 is a graph showing the relationship between the seepage pressures of the porous layers and the cell voltages of the membrane electrode assemblies in Examples 1, 3 and 6 to 8 and Comparative Examples 1 and 3.

The relationship between the seepage pressures of the porous layers and the cell voltages (the power generation properties) of the fuel cells in Examples 1, 3 and 6 to 8 and Comparative Examples 1 and 3, based on the values of FIG. 6, is shown in FIG. 8. As shown in FIG. 8, it is clear that when the porous layer has a seepage pressure of 10 to 60 kPa, the fuel cell can exhibit a cell voltage of 0.70 V or more and thus an excellent power generation property. Further, it is clear that when the porous layer has a seepage pressure of 20 to 60 kPa, the fuel cell can exhibit a cell voltage of 0.71 V or more and thus a more excellent power generation property.

This is because when the porous layer has the physical property values of a thickness of 5 μm or more and a seepage pressure of 10 kPa or more, the generated water or the like are not excessively transferred from the electrode catalyst layer to the gas diffusion layer, so that the electrolyte membrane can be maintained in a wet state to show an excellent proton conductivity.

In addition, when the porous layer has the physical property values of a thickness of 40 μm or less and a seepage pressure of 60 kPa or less, the retention of the generated water or the like can be prevented in the vicinity of the electrode catalyst layer and the gas diffusion layer, so that the reactant gases can be rapidly diffused.

Thus, the power generation property of the membrane electrode assembly can be improved by interposing the porous layer having the above physical property values between the electrode catalyst layer and the gas diffusion layer.

What is claimed is:

1. A membrane electrode assembly used in a fuel cell to which a fuel gas is supplied, comprising a solid polymer electrolyte membrane sandwiched between a pair of electrodes, wherein each of the electrodes contains an electrode catalyst layer and a gas diffusion layer having fibers therein, the electrode catalyst layer facing the electrolyte membrane, wherein the pair of electrodes includes at least a cathode comprising a porous layer having a thickness of 5 to 40 μm, a seepage pressure of 10 to 60 kPa, and a spring constant of 100 to 1000 GPa/m, interposed between the electrode catalyst layer and the gas diffusion layer, so as to separate the electrode catalyst layer and the gas diffusion layer, wherein the porous layer is configured to prevent the fibers of the gas diffusion layer from sticking to the electrolyte membrane.

2. The membrane electrode assembly according to claim 1, wherein the porous layer has a thickness of 15 to 40 μm and a seepage pressure of 15 to 60 kPa.

3. The membrane electrode assembly according to claim 1, wherein the porous layer has a spring constant of 100 to 700 GPa/m.

4. The membrane electrode assembly according to claim 1, wherein the porous layer includes an outer circumferential portion that is gas impermeable.

* * * * *